(12) United States Patent
Kharrat

(10) Patent No.: US 7,389,220 B2
(45) Date of Patent: Jun. 17, 2008

(54) CORRECTING INCOMPLETE NEGATION ERRORS IN FRENCH LANGUAGE TEXT

(75) Inventor: Alma Kharrat, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1545 days.

(21) Appl. No.: 09/809,899

(22) Filed: Mar. 16, 2001

(65) Prior Publication Data
US 2002/0133331 A1   Sep. 19, 2002

Related U.S. Application Data

(60) Provisional application No. 60/242,406, filed on Oct. 20, 2000.

(51) Int. Cl.
G06F 17/20 (2006.01)
G06F 17/28 (2006.01)

(52) U.S. Cl. ............................... 704/1; 704/7
(58) Field of Classification Search ............ 704/8, 704/9, 10, 1, 7; 345/347
See application file for complete search history.

(56) References Cited

U.S. PATENT DOCUMENTS

| | | | | |
|---|---|---|---|---|
| 5,477,451 A * | 12/1995 | Brown et al. | ........... | 704/9 |
| 5,805,832 A * | 9/1998 | Brown et al. | ........... | 711/1 |
| 5,850,627 A * | 12/1998 | Gould et al. | ........... | 704/231 |
| 5,870,700 A * | 2/1999 | Parra | ........... | 704/9 |
| 6,012,075 A * | 1/2000 | Fein et al. | ........... | 715/540 |
| 6,292,772 B1 * | 9/2001 | Kantrowitz | ........... | 704/9 |
| 6,393,389 B1 * | 5/2002 | Chanod et al. | ........... | 704/7 |
| 2002/0128819 A1 * | 9/2002 | Jessee et al. | ........... | 704/10 |

OTHER PUBLICATIONS

Mogilevski, Eugene. "Le Correcteur 101: A comparative evaluation of 2.2 versus 3.5 Pro,"☐☐CALICO journal, vol. 16, No. 2, 1998 : pp. 183-186.*

Laura K. Lawless' French language notes from http://french.about.com.*

Binkley; Susan C.; The Bilingual Corector 2.0; p. 11 foot note #1; https://www.calico.org/p-58-The%20Bilingual%20Corrector%202.0.html.*

"From the Developer to the Learner: Describing Grammar—Learning Grammar", by M. Schulze, *ReCALL: The Journal of EUROCALL*, vol. 11, No. 1, pp. 117-124 (May 1999).

"Francophone Stylistic Grammar Checking (FSGC) Using Link Grammars", by T. Brehony et al., *Computer Assisted Language Learning*, vol. 7, No. 3, pp. 257-269 (1994).

(Continued)

*Primary Examiner*—Dwayne Bost
*Assistant Examiner*—Myriam Pierre
(74) *Attorney, Agent, or Firm*—Joseph R. Kelly; Westman, Champlin & Kelly, P.A.

(57) ABSTRACT

A computer-implemented grammar checker for French language text corrects negation errors (missing particle "ne/n'") in French language text. A parser generates a syntax record of a verbal phrase of the text. The syntax record includes records of words in the verbal phrase, lexicon information for the words, and syntax attributes for the words. The grammar checker searches the syntax record for a missing particle "ne/n'". If the particle "ne/n'" is not found, the grammar checker calculates a syntactically correct insertion point for the particle "ne/n'". The grammar checker displays to the user a rewrite of a correct form of the particle "ne/n'" at the insertion point.

17 Claims, 14 Drawing Sheets

OTHER PUBLICATIONS

"Implementation of the Formalism for a Grammar Checker", by J. Hric, *Proc 2$^{nd}$ Int Conf. Practical Application of Prolog.*, pp. 271-280, (1994).

"I Ate The Fish With a Fork", by P. Rutten, *Language Technology*, vol. 10, pp. 26-30, (1988).

"Analyse Syntaxique Globale & Correction Grammaticale Etendue", by R. Ashori-Hechmati, *Twelfth International Conference Artificial Intelligence, Expert Systems*, pp. 41-53, (1992).

"La Vérificiation et la Correction Automatique de Textes: Le Système VORTEX", by G. Perennou et al., *Technique et Science Informatique*, vol. 5, No. 4, pp. 285-305, (1986).

"Analyse Automatique d'erreurs: Stratégie Linguistique et Computationnelle", by J. Chanod, *Actes du Colloque Informatique et Langue Naturelle*, pp. 55-71, (1991).

"Problemes D'Analyse Syntaxique Pour Les Correcteurs Grammaticaux", by P. Blache, *Universite de Neuchatel*, pp. 163-174, (1991).

\* cited by examiner

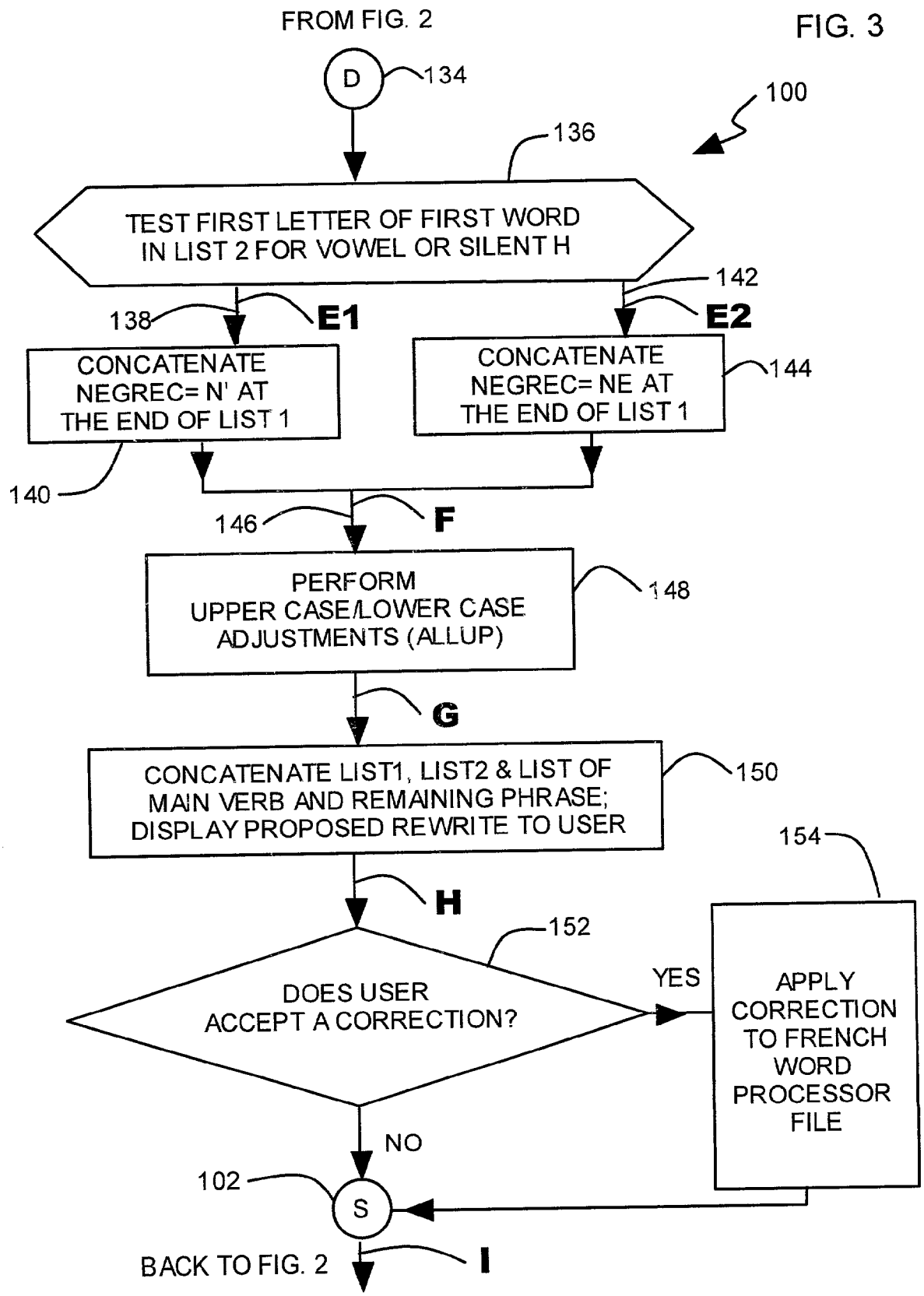

SYNTAX RECORD ("SYNREC")

286 — PHRASE ATTRIBUTES

| BIT NAME | BIT VALUE REPRESENTS |
|---|---|
| PHRASE TYPE | INDEPENDENT CLAUSE, DEPENDENT CLAUSE, QUESTION, IMPERATIVE, DECLARATIVE, ETC. |

WORD RECORDS (WORD 1) — 280

LEXICON INFORMATION — 282

| | |
|---|---|
| CLITIC | PRONOUN |
| NEGPOL | WORD WHICH MAY REQUIRE "NE" |
| NUMBER | SINGULAR OR PLURAL |
| GENDER | FEMININE OR MASCULINE |

SYNTAX ATTRIBUTES — 284

| | |
|---|---|
| PERSON | FIRST, 2ND OR 3RD PERSON |
| MOOD | SUBJUNCTIVE OR INDICATIVE |
| TENSE | PRESENT, FUTURE, PAST |
| PART OF SPEECH | SUBJECT, DIRECT OBJECT |

(WORD 2) — 280
(WORD 3)
(WORD N)

FIG. 4

| PROCESS POINT IN FIGS. 2-3 | PRMODS | LIST1 | LIST2 | LIST OF MAIN VERB & REMAINING PHRASE |
|---|---|---|---|---|
| A | (EMPTY) | (EMPTY) | (EMPTY) | (EMPTY) |
| B | J'ai pas | J'ai pas | (EMPTY) | mangé |
| C | J'ai pas | J' | ai pas | mangé |
| D | J'ai pas | Je | ai pas | mangé |
| E | J'ai pas | Je | ai pas | mangé |
| F | J'ai pas | Je n' | ai pas | mangé |
| G | J'ai pas | Je n' | ai pas | mangé |
| H | J'ai pas | Je n' | ai pas | mangé |
| I | (EMPTY) | (EMPTY) | (EMPTY) | (EMPTY) |

FIG. 5

| PROCESS POINT IN FIGS. 2-3 | PRMODS | LIST1 | LIST2 | LIST OF MAIN VERB & REMAINING PHRASE |
|---|---|---|---|---|
| A | (EMPTY) | (EMPTY) | (EMPTY) | (EMPTY) |
| B | (EMPTY) | (EMPTY) | (EMPTY) | Fais pas cela |
| C | (EMPTY) | (EMPTY) | (EMPTY) | Fais pas cela |
| D | (EMPTY) | (EMPTY) | (EMPTY) | Fais pas cela |
| E | (EMPTY) | (EMPTY) | (EMPTY) | Fais pas cela |
| F | (EMPTY) | ne | (EMPTY) | Fais pas cela |
| G | (EMPTY) | Ne | (EMPTY) | fais pas cela |
| H | (EMPTY) | Ne | (EMPTY) | fais pas cela |
| I | (EMPTY) | (EMPTY) | (EMPTY) | (EMPTY) |

FIG. 6

| PROCESS POINT IN FIGS. 2-3 | PRMODS | LIST1 | LIST2 | LIST OF MAIN VERB & REMAINING PHRASE |
|---|---|---|---|---|
| A | (EMPTY) | (EMPTY) | (EMPTY) | (EMPTY) |
| B | pour pas | pour pas | (EMPTY) | échouer |
| C | pour pas | pour | pas | échouer |
| D | pour pas | pour | pas | échouer |
| E | pour pas | pour | pas | échouer |
| F | pour pas | pour ne | pas | échouer |
| G | pour pas | pour ne | pas | échouer |
| H | pour pas | pour ne | pas | échouer |
| I | (EMPTY) | (EMPTY) | (EMPTY) | (EMPTY) |

FIG. 7

| PROCESS POINT IN FIGS. 2-3 | PRMODS | LIST1 | LIST2 | LIST OF MAIN VERB & REMAINING PHRASE |
|---|---|---|---|---|
| A | (EMPTY) | (EMPTY) | (EMPTY) | (EMPTY) |
| B | pour | pour | (EMPTY) | écouter personne |
| C | pour | pour | (EMPTY) | écouter personne |
| D | pour | pour | (EMPTY) | écouter personne |
| E | pour | pour n' | (EMPTY) | écouter personne |
| F | pour | pour n' | (EMPTY) | écouter personne |
| G | pour | pour n' | (EMPTY) | écouter personne |
| H | pour | (EMPTY) | (EMPTY) | écouter personne |
| I | (EMPTY) | (EMPTY) | (EMPTY) | (EMPTY) |

FIG. 8

| PROCESS POINT IN FIGS. 2-3 | PRMODS | LIST1 | LIST2 | LIST OF MAIN VERB & REMAINING PHRASE |
|---|---|---|---|---|
| A | (EMPTY) | (EMPTY) | (EMPTY) | (EMPTY) |
| B | pour | pour | (EMPTY) | ÉCOUTER personne |
| C | pour | pour | (EMPTY) | ÉCOUTER personne |
| D | pour | pour | (EMPTY) | ÉCOUTER personne |
| E | pour | pour n' | (EMPTY) | ÉCOUTER personne |
| F | pour | pour N' | (EMPTY) | ÉCOUTER personne |
| G | pour | pour N' | (EMPTY) | ÉCOUTER personne |
| H | (EMPTY) | (EMPTY) | (EMPTY) | (EMPTY) |
| I | | | | |

FIG. 9

CORRECTING INCOMPLETE NEGATION ERRORS IN FRENCH LANGUAGE TEXT

CROSS-REFERENCE TO RELATED APPLICATION

This application claims priority benefits from U.S. Provisional Application 60/242,406 titled "Correcting incomplete negation errors in French language text", filed Oct. 20, 2000.

BACKGROUND OF THE INVENTION

Text-processing computer applications such as word processor and email applications use grammar-checking software modules A grammar-checking module examines a sentence of text for errors or deviations from simple grammar rules for a particular language being used.

There is a desire to improve French language grammar checkers so that the grammar checker can detect and correct an error called incomplete negation. Incomplete negation occurs when a negated verbal phrase is missing the particle "ne" or its elided form "n'" in expressions with negation words, e.g. expressions such as "ne . . . pas", "ne . . . rien", "ne . . . personne," "n' . . . jamais", "ne . . . plus", "n' . . . que", and the like.

However, with the French language, difficult problems are encountered in any attempt to correct for incomplete negation using a grammar checker program operating on a computer. Words such as "pas", "que" sometimes are negation words that require the particle "ne", and at other times these same words are not negation words and have other semantic meanings that do not involve negation and do use the particle "ne." The grammar checker does not have access to the writer's intended meaning to help it in ascertaining whether a "ne" is needed in the sentence.

A method of grammar checking and a grammar checking computer program are needed that provide the desired checking and correction of incomplete negation in French language phrases.

SUMMARY OF THE INVENTION

A computer-implemented grammar checker for French language text corrects negation errors (missing particle "ne/n'") in French language text. A parser generates a syntax record of a verbal phrase of the text. The syntax record includes records of words in the verbal phrase, lexicon information for the words, and syntax attributes for the words. The grammar checker searches the syntax record for a missing particle "ne/n'". If the particle "ne/n'" is not found, the grammar checker calculates a syntactically correct insertion point for the particle "ne/n'". The grammar checker displays or renders to the user a rewrite of a correct form of the particle "ne/n'" at the insertion point.

BRIEF DESCRIPTION OF THE DRAWINGS

FIGS. 2 and 3 together schematically illustrate a flow chart of a process for detecting and correcting incomplete negation errors in French language text.

FIG. 4 schematically illustrates a syntax record SYNREC obtained from a parser.

FIGS. 5-9 illustrate examples of correcting incomplete negation errors in French language verbal phrases at process points A through I in FIGS. 2-3.

DETAILED DESCRIPTION OF THE PREFERRED EMBODIMENTS

A French grammar checker checks for and corrects a grammatical error called "incomplete negation" with a degree of reliability suitable for use with text processing computer programs. The French grammar checker provides a reasonably limited number of proposed corrections to the user when an incomplete negation error is detected.

Typically, to express negation in French, at least two words need to be used in the same verbal phrase: the particle "ne" (or its elided form "n'") and at least one negation word such as pas, rien, personne, jamais, plus, que, etc.

Incomplete negation occurs when the particle ne is missing from a verbal phrase, causing the latter to be ungrammatical. If incomplete negation is detected by the grammar checker, a rewrite (correction) of the error is presented to the user.

A parser provides a syntax record (herein: "SYNREC") to the grammar checker application module. The syntax record includes a verbal phrase. The syntax record also includes lexicon data on each word in the verbal phrase and syntax attributes on each word in the verbal phrase. The syntax record has information similar to information in a sentence diagram, but is arranged in a tabular record instead of a diagram. The phrase may be a complete sentence, or a verbal phrase that is part of a sentence which can have some combination of subject, direct object or indirect object. In one embodiment, a simple sentence with a main verb is handled as a single verbal phrase, and the parser generates one syntax record to represent the simple sentence. A complex sentence with a main clause and a subordinate clause is handled as two verbal phrases, each with its own main verb. For the complex sentence, the parser generates one syntax record for the main clause and another syntax record for the subordinate clause.

The grammar checker analyzes each syntax record to detect a negation error. If there is a negation error, the sentence is divided into lists based on the data in the syntax record. The lists are adjusted according to grammar rules to further divide the sentence at a proper insertion point for the particle "ne". A correction is presented to the user. If the user accepts the correction then the particle ne (or its contracted or elided form n') is added at the insertion point. The text or word processor file is updated to include the correction.

Figure 1:
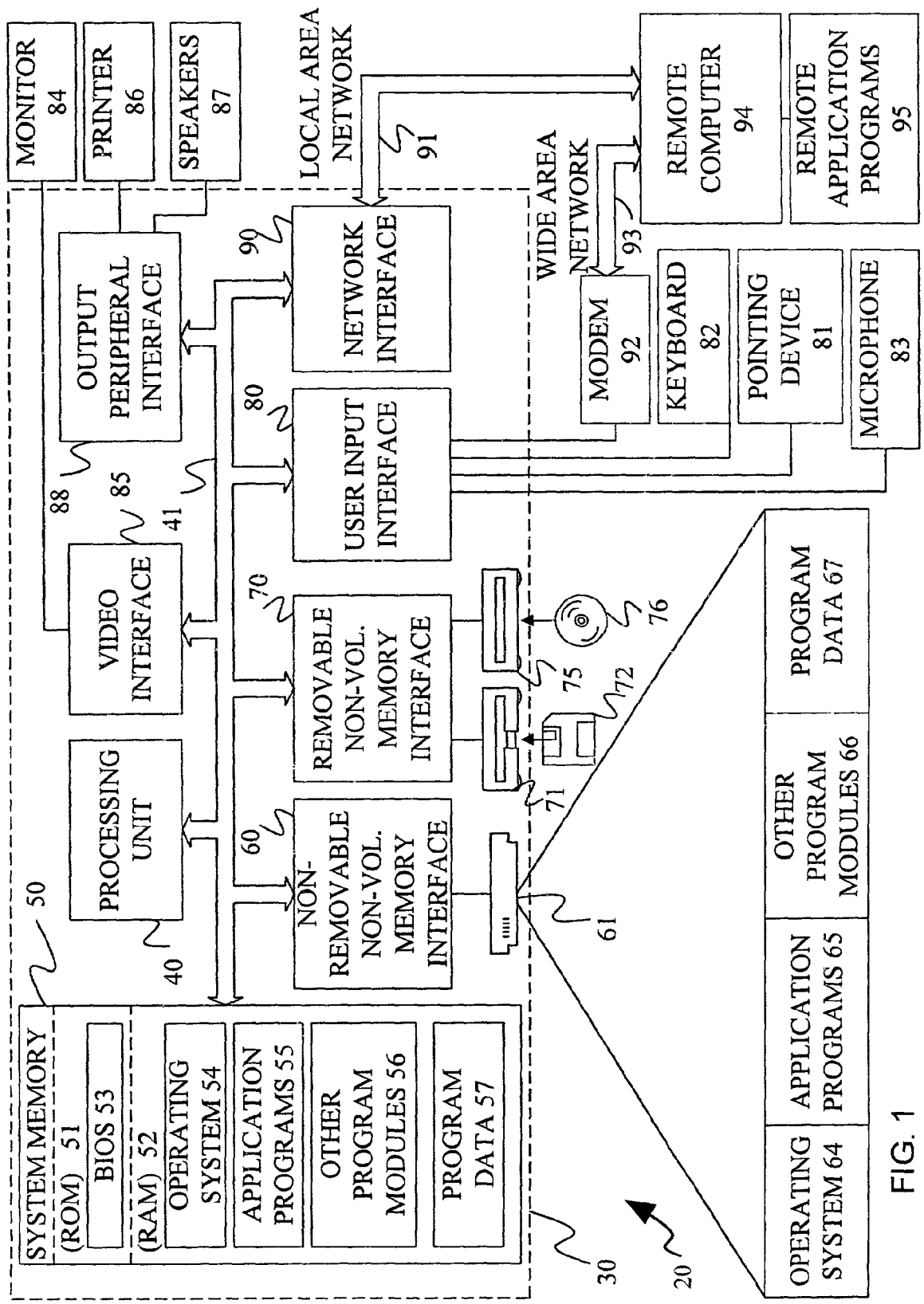
FIG. 1 illustrates a block diagram of an exemplary computing environment.

Prior to a detailed discussion of the present invention, an overview of an operating environment may be helpful. FIG. 1 and the related discussion provide a brief, general description of a suitable computing environment 20 in which the invention can be implemented. The computing system environment 20 is only one example of a suitable computing environment and is not intended to suggest any limitation as to the scope of use or functionality of the invention. Neither should the computing environment 20 be interpreted as having any dependency or requirement relating to any one or combination of components illustrated in the exemplary operating environment 20.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like. In addition, the invention may be used in a telephony system.

The invention may be described in the general context of computer-executable instructions, such as application modules, being executed by a computer. Generally, application modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable media.

With reference to FIG. 1, the exemplary system for implementing the invention includes a general-purpose computing device in the form of a computer 30. Components of computer 30 may include, but are not limited to, a processing unit 40, a system memory 50, and a system bus 41 that couples various system components including the system memory to the processing unit 40. The system bus 41 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 30 typically includes a variety of computer readable media. Computer readable media can be any available media that can be accessed by computer 30 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 20. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 50 includes computer storage media in the form of volatile and/or nonvolatile memory such as read only memory (ROM) 51 and random access memory (RAM) 52. A basic input/output system 53 (BIOS), containing the basic routines that help to transfer information between elements within computer 30, such as during start-up, is typically stored in ROM 51. RAM 52 typically contains data and/or program modules that are immediately accessible to and/or presently being operated on by processing unit 40. By way of example, and not limitation, FIG. 1 illustrates operating system 54, application programs 55, other program modules 56, and program data 57.

The computer 30 may also include other removable/non-removable volatile/nonvolatile computer storage media. By way of example only, FIG. 1 illustrates a hard disk drive 61 that reads from or writes to non-removable, nonvolatile magnetic media, a magnetic disk drive 71 that reads from or writes to a removable, nonvolatile magnetic disk 72, and an optical disk drive 75 that reads from or writes to a removable, nonvolatile optical disk 76 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 61 is typically connected to the system bus 41 through a non-removable memory interface such as interface 60, and magnetic disk drive 71 and optical disk drive 75 are typically connected to the system bus 41 by a removable memory interface, such as interface 70.

The drives and their associated computer storage media discussed above and illustrated in FIG. 1, provide storage of computer readable instructions, data structures, program modules and other data for the computer 30. In FIG. 1, for example, hard disk drive 61 is illustrated as storing operating system 64, application programs 65, other program modules 66, and program data 67. Note that these components can either be the same as or different from operating system 54, application programs 55, other program modules 56, and program data 57. Operating system 64, application programs 65, other program modules 66, and program data 67 are given different numbers here to illustrate that, at a minimum, they are different copies.

A user may enter commands and information into the computer 30 through input devices such as a keyboard 82, a microphone 83, and a pointing device 81, such as a mouse, trackball or touch pad. Other input devices (not shown) may include a joystick, game pad, satellite dish, scanner, or the like. These and other input devices are often connected to the processing unit 40 through a user input interface 80 that is coupled to the system bus, but may be connected by other interface and bus structures, such as a parallel port, game port or a universal serial bus (USB). A monitor 84 or other type of display device is also connected to the system bus 41 via an interface, such as a video interface 85. In addition to the monitor, computers may also include other peripheral output devices such as speakers 87 and printer 86, which may be connected through an output peripheral interface 88.

The computer 30 may operate in a networked environment using logical connections to one or more remote computers, such as a remote computer 94. The remote computer 94 may be a personal computer, a handheld device, a server, a router, a network PC, a peer device or other common network node, and typically includes many or all of the elements described above relative to the computer 30. The logical connections depicted in FIG. 1 include a local area network (LAN) 91 and a wide area network (WAN) 93, but may also include other networks. Such networking environments are commonplace in offices, enterprise-wide computer networks, intranets and the Internet.

When used in a LAN networking environment, the computer 30 is connected to the LAN 91 through a network interface or adapter 90. When used in a WAN networking environment, the computer 30 typically includes a modem 92 or other means for establishing communications over the WAN 93, such as the Internet. The modem 92, which may be internal or external, may be connected to the system bus 41 via the user input interface 80, or other appropriate mechanism. In a networked environment, program modules depicted relative to the computer 30, or portions thereof, may be stored in the remote memory storage device. By way of example, and not limitation, FIG. 1 illustrates remote application programs 95 as residing on remote computer 94. It will be appreciated that the network connections shown are exemplary and other means of establishing a communications link between the computers may be used.

Figure 2:
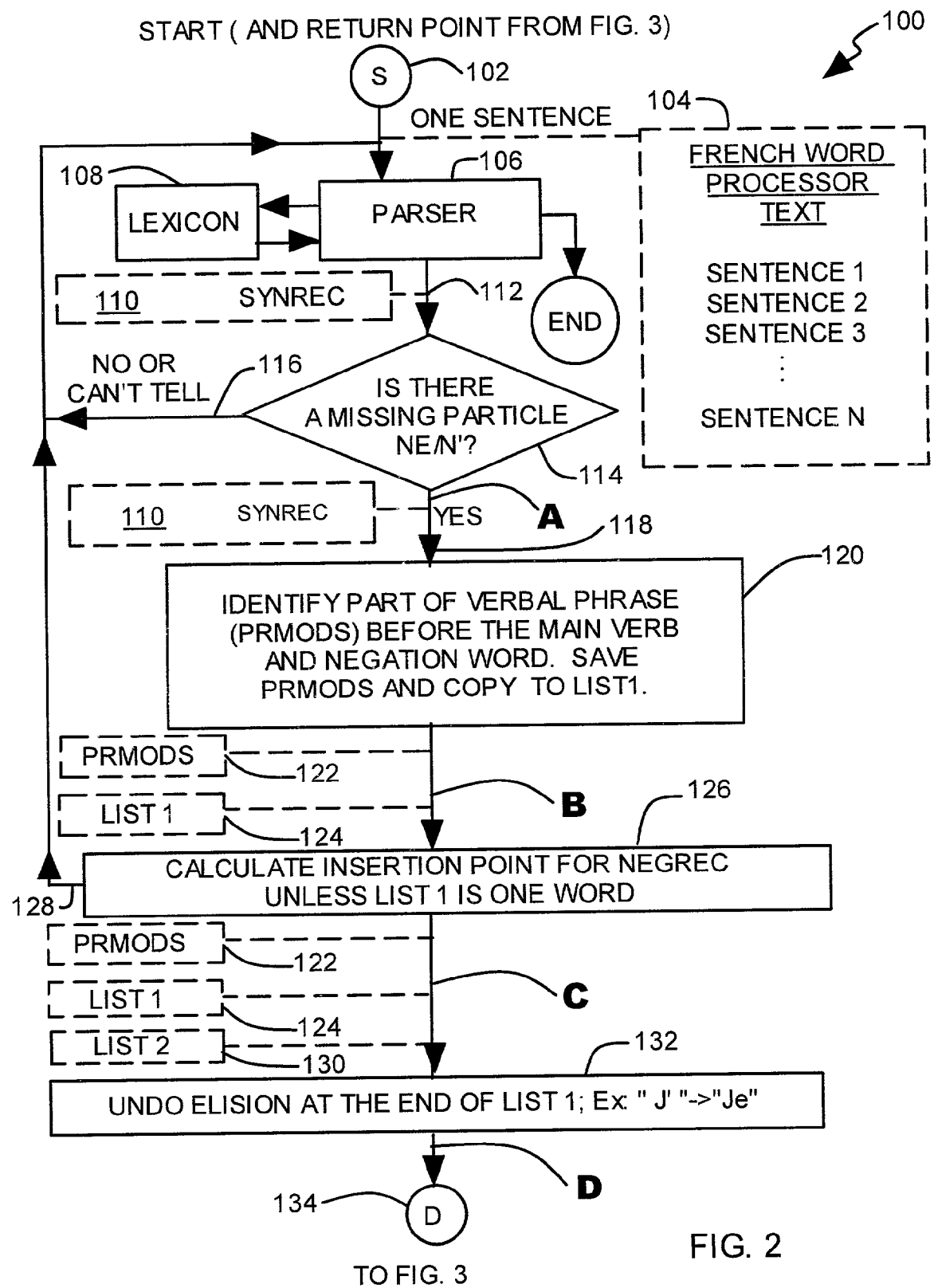

FIGS. 2 and 3 together schematically illustrate a flow chart of a process 100 for detecting and correcting incomplete negation errors in a French language text 104. Process 100 is marked with bold type letters A, B, C, . . . I that identify points in the flow of process 100. These same bold type letters are also used to identify these points in the examples illustrated in FIGS. 5-9 and detailed flow charts in FIGS. 10-14. The process or method 100 is a computer-implemented method 100 that can be implemented in operating environments such as those discussed above in connection with FIG. 1. It is to be understood that the various program flows and processes described below are performed by a processor in a computer system.

Process flow starts at the top of FIG. 2 at START ("S") 102. One sentence at a time of the French language text 104 is transferred to parser 106. Parser 106 separates the sentence, if needed, into verbal phrases, with each verbal phrase having a main verb. For each such verbal phrase, the parser 106 generates a syntax record 110 (SYNREC) by parsing the verbal phrase. An example of a syntax record 110 (SYNREC) is explained in more detail below in connection with an example illustrated in FIG. 4.

The parser 106 accesses a lexicon 108 and uses lexicon information to generate the syntax record 110. The syntax record 110 is passed at line 112 to process 114. When the French text 104 has been completely checked for negation errors, then the parser 106 exits at END.

In search process 114, a computer searches the syntax record 110 for a missing particle "ne/n'". The term "ne/n'" refers to the negation particle "ne" and its elided or contracted form "n'" as well. If process 114 determines that, for a particular phrase, there is no missing particle "ne/n'" or if it can't tell if there is a missing particle, then no attempt is made to correct negation and program flow goes back to the start 102 as illustrated at 116 in FIG. 2. On the other hand, if a particle "ne/n'" is reliably determined as missing, then program flow continues as illustrated at 118 (point A) on to further processes to correct the error. Generally, if the particle "ne/n'" is not found in search process 114, a syntactically correct insertion point for the particle "ne/n'" is calculated at 126 and a rewrite is displayed to the user at the insertion point as illustrated at 150. The rewrite displayed includes a correct form of the particle, either "ne" or "n'".

An example of search process 114 is discussed in more detail below in connection with FIG. 10.

Program flow continues from point A (at 118) to an identifying process 120. Identifying process 120 identifies a part of the verbal phrase that precedes a main verb indicated in the syntax record, and copies the identified part of the verbal phrase to a first record, PRMODS 122. Also, the identifying process 120 creates a second copy of PRMODS 122 called LIST1 illustrated at 124 at point B.

An example of the process 120 is discussed in more detail in connection with FIG. 11.

Program flow continues from point B to calculation process 126. Process 126 calculates an insertion point in LIST1 for later insertion of a record NEGREC, which is a record of the missing particle. Process 126 removes the text after the insertion point from LIST1 at 124 and copies the removed material to a record LIST2 at 130 as illustrated at point C. For example, in a simple declarative phrase, the insertion point is calculated by the following steps:

A. testing the syntax record for each word in the first record to determine if it is a non-subject pronoun;

B. testing the syntax record for each word in the first record to determine if it is a subject pronoun; and C. moving the portion of the first record that is after any subject pronoun and includes any non-subject pronouns to a second record to place the insertion point between the end of the first record and the start of the second record.

An example of the process 126 is discussed in more detail below in connection with FIG. 12.

Process flow continues from point C to undoing process 132. Process 132 undoes any elision (contraction) at the end of LIST1. For example if "J'" is at the end of LIST1, then process 132 removes "J'" and concatenates or substitutes "Je" at the end of LIST1. This change is needed because the particle "ne/n'" is later concatenated to the end of LIST1 and "ne/n'" starts with a consonant and never requires elision of the preceding word in LIST1. After process 132 is completed program flow continues at point D at 134 at the bottom of FIG. 2 to point D at 134 at the top of FIG. 3.

Program flow continues in FIG. 3 from point D to testing process 136. Process 136 tests the verbal phrase immediately following the insertion point for an initial vowel or a silent "h". If an initial vowel or silent H is found, then program flow continues along line 138 at point E1 to concatenating process 140. In process 140, the record NEGREC is loaded with the value "n'", and NEGREC is concatenated to the end of LIST1, in other words, at the insertion point. If an initial vowel or silent H is not found, then program flow continues along line 142 at point E2 to concatenating process 144. In process 144, the record NEGREC is loaded with the value "ne", and NEGREC is concatenated to the end of LIST1, in other words, at the insertion point. Either concatenating process 140 or 144 is performed, and then program flow continues to point F at 146.

Program flow continues from point F to upper case/lower case adjustment process 148, also called ALLUP. Process 148 adjusts the typography of the particle at the end of LIST1 to correspond with the typography of the first word at the beginning of LIST2. If the first word in LIST2 is in ALL CAPITAL LETTERS for example, then the particle NE/N' will be changed to ALL CAPITALS as well. Other corrections to capitalization can be made in process 148 as well. Program flow continues after process 148 to point G.

Program flow continues from point G to concatenating and display process 150. Process 150 concatenates LIST1, LIST2, and a list of the remaining phrase that includes the main verb, and displays the concatenation to the user as a correction. Program flow continues form process 150 to point H.

Program flow continues from point H to process 152 in which the computer waits for an action from the user. If the user accepts the correction (by a mouse or keyboard actuation, for example), then the concatenation prepared in process 150 is substituted in the French word processor file 104 for the current phrase as illustrated at 154. After process 154, program flow continues to point I at 102. If the user does not accept the correction (as indicated by a mouse or keyboard actuation, for example), then program flow continues to point I at 102 without changing the French word processor file 104.

Process flow continues from point I at the bottom of FIG. 3 to start 102 at the top of FIG. 2. Process flow continues to iteratively loop around the flow chart illustrated at 100 until all of the phrases in word processor file 104 have been checked for the negation error. When all the phrases have been checked and there are no more phrases in the file to check, then program flow exits from the parser 106 to END.

FIG. 4 schematically illustrates an example of a syntax record SYNREC 110 obtained from a parser 106. The syntax record 110 includes records of words 280 in the verbal phrase, lexicon information 282 for the words 280, and syntax attributes 284 for the words 280 such as the examples schematically illustrated in FIG. 4.

The syntax record 110 includes phrase attributes 286 that are used in determining the syntactically correct word order for the phrase. There are different word orders in imperative, interrogatory and declarative sentences. There are also different word orders depending on the tense of the verb. The phrase attributes 286 are used in calculating the insertion point, and also the initial dividing point between LIST 1 and the rest of the phrase.

The syntax record 110 includes the same kind of information that is present in a highly detailed sentence diagram. The syntax record, however, is in tabular form for convenient access by the processor in a computer system. Each syntax record corresponds to one verbal phrase, in other words, a verbal phrase with a main verb. Complex sentences with multiple verbal phrases are parsed so that a syntax record 110 is generated for each verbal phrase in the sentence. This technique reduces the complexity needed in the rest of the program for testing for negation errors and calculating insertion points.

FIGS. 5-9 illustrate examples of correcting incomplete negation errors in French language verbal phrases at process points A through I in FIGS. 2-3. FIGS. 5-9 illustrate the contents of PRMODS, LIST1, LIST2 and a list of the remaining phrase including the main verb. The contents of these lists can change as the processor proceeds through steps A through I, depending on the syntax record and the type of capitalization that is used.

In FIG. 5, the contents of PRMODS, LIST1, LIST2 and the list of the remaining sentence that includes the main verb are illustrated for the declaratory phrase "J'ai pas mangé". This phrase has a negation error, in other words it has the word "pas" used syntactically to require the particle "ne" which is missing. At point B, "J'ai pas" has been copied to PRMODS and LIST1. At point C, "ai pas" has been moved to LIST2, leaving "J'" in LIST1. At point D, the elision of "J'" has been undone and the contents of LIST1 is "Je". At point F, the particle "n'" has been concatenated to the end of LIST1 making the contents of LIST1 "Je n'". At point H, LIST1, LIST2 and the list of the remaining phrase are concatenated to "Je n'ai pas mangé." The negation error has been corrected. Upon completing the correction, PRMODS, LIST1, LIST2 and the list of the remaining phrase are all cleared or emptied at point I in preparation for returning to start to process the next phrase.

In FIG. 6, the contents of PRMODS, LIST1, LIST2 and the list that includes the main verb are illustrated for the imperative phrase "Fais pas cela!" This phrase has a negation error, in other words it has the word "pas" used syntactically to require the particle "ne" which is missing. PRMODS LIST1 and LIST2 are empty at points A through E because of the imperative word order. At point F, the particle "ne" has been concatenated to the end of LIST1 making the contents of LIST1 "ne". At point G, the particle "ne" has been capitalized because it is the first word of the sentence, and the word "Fais" is changed to all lower case because it is no longer the first word in the sentence. At point H, LIST1, LIST2 and the list of the remaining phrase are concatenated to "Ne fais pas cela!" The negation error has been corrected. Upon completing the correction, PRMODS, LIST1, LIST2 and the list of the remaining phrase are all cleared or emptied at point I in preparation for returning to start to process the next phrase.

In FIG. 7, the contents of PRMODS, LIST1, LIST2 and the list of the remaining sentence are illustrated for the declarative phrase "pour pas échouer". This phrase has a negation error, in other words it has the word "pas" used syntactically to require the particle "ne" which is missing. The text "pour pas" is copied into PRMODS and LIST1 and LIST2 at point B. At point C, "pas" is moved from LIST1 to LIST2. At point F, the particle "ne" has been concatenated to the end of LIST1 making the contents of LIST1 "pour ne". At point H, LIST1, LIST2 and the list of the remaining phrase are concatenated to "pour ne pas échouer." The negation error has been corrected. Upon completing the correction, PRMODS, LIST1, LIST2 and the list of the remaining phrase are all cleared or emptied at point I in preparation for returning to start to process the next phrase.

In FIG. 8, the contents of PRMODS, LIST1, LIST2 and the list of the remaining sentence are illustrated for the declarative phrase "pour écouter personne." This phrase has a negation error, in other words it has the word "personne" used syntactically to require the particle "ne" which is missing. The text "pour" is copied into PRMODS and LIST1 at point B. At point F, the particle "n'" has been concatenated to the end of LIST1 making the contents of LIST1 "pour n'". At point H, LIST1, LIST2 and the list of the remaining phrase are concatenated to "pour n'écouter personne." The negation error has been corrected. Upon completing the correction, PRMODS, LIST1, LIST2 and the list of the remaining phrase are all cleared or emptied at point I in preparation for returning to start to process the next phrase.

In FIG. 9, the contents of PRMODS, LIST1, LIST2 and the list of the remaining phrase are illustrated for the declarative phrase "pour ÉCOUTER personne." This phrase has a negation error, in other words, it has the word "personne" used syntactically to require the particle "ne" which is missing. This sentence also has the word "ÉCOUTER" in all capital letters. The text "pour" is copied into PRMODS and LIST1 at point B. At point F, the particle "n'" has been concatenated to the end of LIST1 making the contents of LIST1 "pour n'". At point G, the particle "n'" has been changed to a capital "N'" because "ÉCOUTER" is in all capital letters. At point H, LIST1, LIST2 and the list of the remaining phrase are concatenated to "pour N'ÉCOUTER personne." The negation error has been corrected. Upon completing the correction, PRMODS, LIST1, LIST2 and the list of the remaining phrase are all cleared or emptied at point I in preparation for returning to start to process the next phrase.

Figure 10:
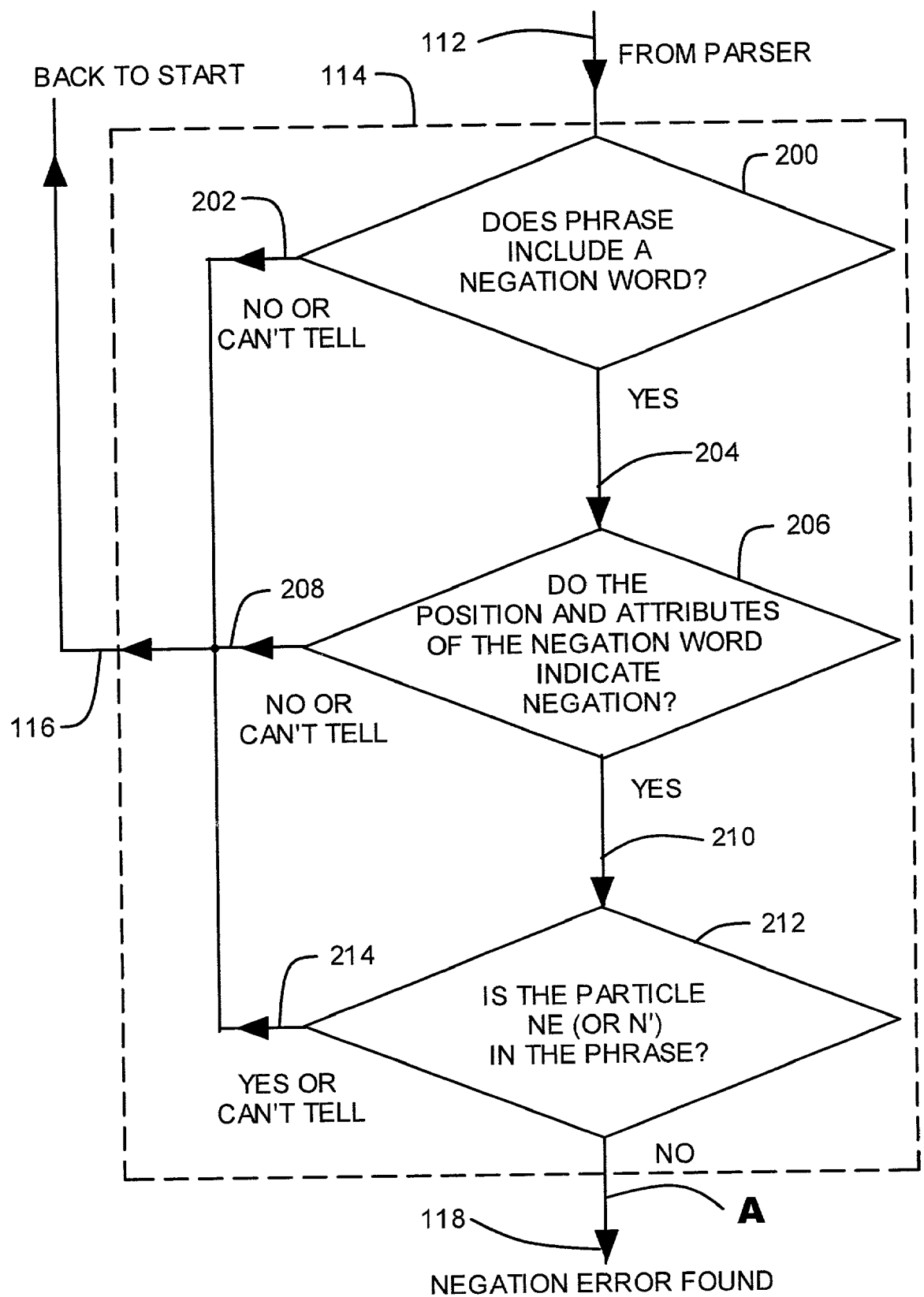
FIG. 10 schematically illustrates a flow chart of a process of detecting a negation error in a French language verbal phrase.

FIG. 10 schematically illustrates a flow chart of a process 114 detecting a negation error in a French language verbal phrase. The process 114 illustrated in FIG. 10 searches the syntax record 110 for a missing particle "ne/n'" using the following steps:

A. Searching the syntax record 110 as illustrated at searching process 200 for a negation word. If a negation word in not found or it is uncertain if a negation word is found, then program flow returns at 202 to the start 102 along line 116. If a negation word is reliably found, then program flow continues along line 205 to testing process 206.

B. Testing process 206 tests position and other syntax attributes of the negation word to determine if the syntax attribute of the negation word indicates negation. If negation is not indicated, or if it is uncertain that negation is indicated, then program flow returns at 208 to the start 102 along line 116. For example, if the testing process finds the word "pas" likely used as a noun, then the testing process will continue back at 208. If negation is reliably indicated, then program flow continues along line 212 to testing process 212. For example, if the testing program finds the word "pas" used as an adverb likely indicating negation, then program flow will continue along line 210.

C. Testing process 212 tests or searches the syntax record for the particle "ne/n'". If the particle "ne/n'" is found then there is no negation error found and program flow returns at 214 to start 102 along line 116. If the particle "ne/n'" is not found, then there is a negation error found and program flow continues along line 118 to point A, and correction is made in subsequent steps.

Figure 11:
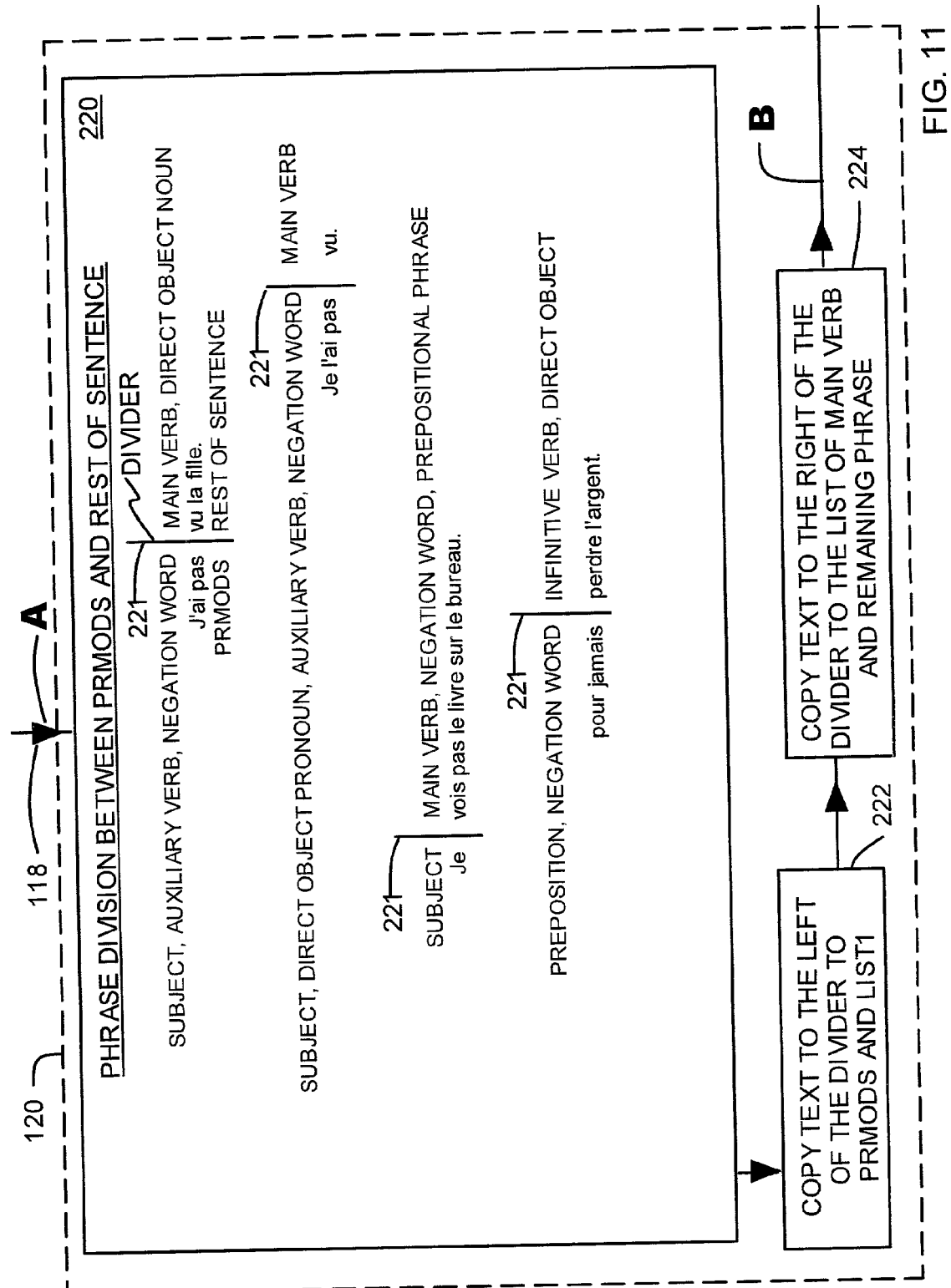
FIG. 11 schematically illustrates a flow chart of a process of identifying a divider point at the end of PRMODS.

FIG. 11 schematically illustrates a flow chart of a process 120 of identifying a divider point 221 at the end of PRMODS. Program flow starts at 118, or point A. Program flow goes first to process 220 where a phrase is initially divided up between PRMODS and the rest of the phrase by a divider 221. The placement of the divider 221 is a function of the information found in the syntax record 110. In particular, the phrase divider 221 is placed ahead of the main verb. The divider may be before or after a negation word depending on the phrase attributes 286 and the tense of the verb, which is a syntax attribute 284. Several examples of the placement of the divider 221 are shown in process block 220, illustrating some of the variations that are handled by process 220.

After process 220 is completed, a copy of text to the left of the divider 221 is copied to PRMODS and LIST1 at process 222. Next, a copy of text to the right of the divider 221 is copied to the list of the rest of the sentence at process 224. After process 224 is complete, process flow continues at point B as shown in FIGS. 2-3.

Figure 12:
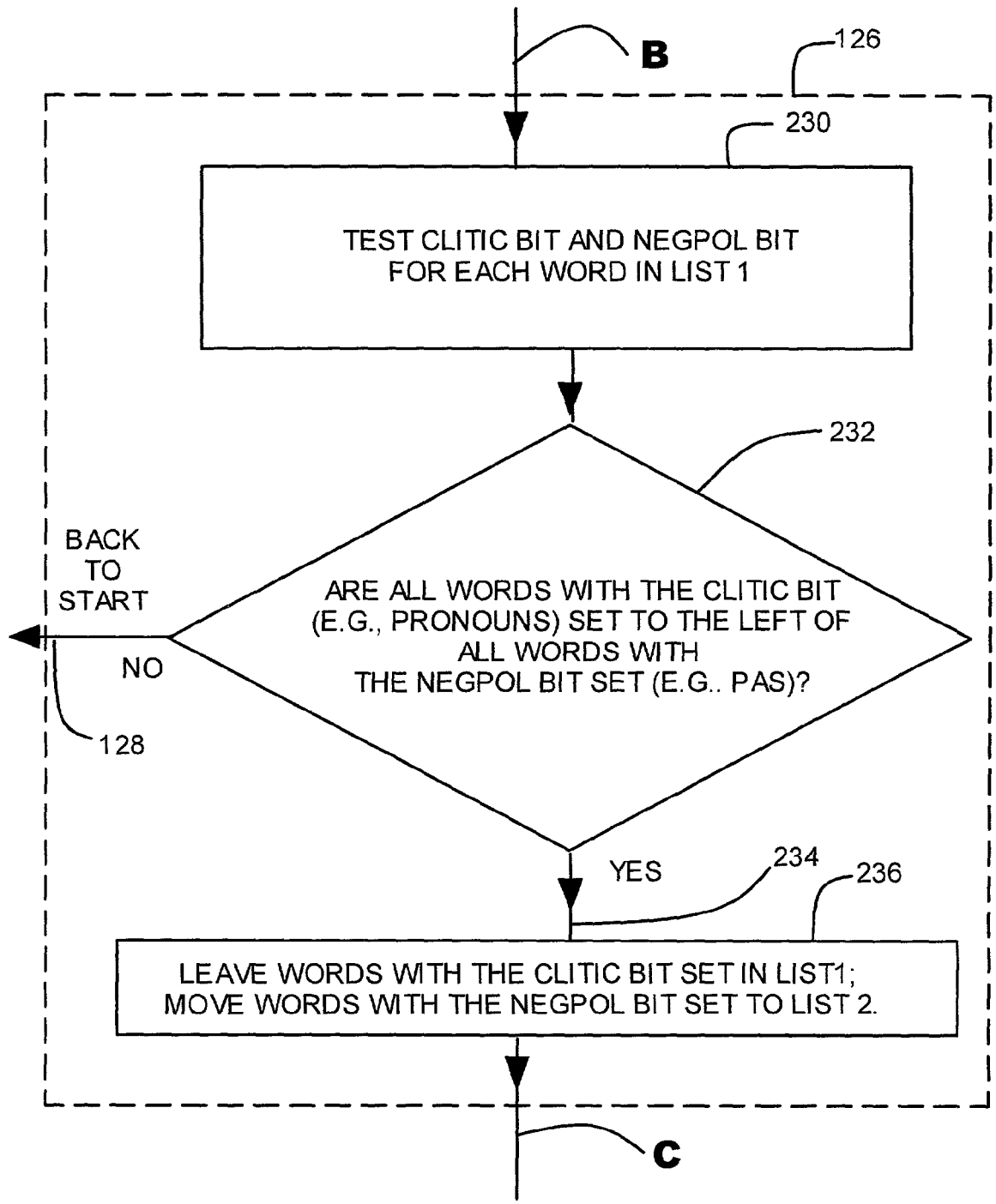
FIG. 12 schematically illustrates a flow chart of a process of identifying and moving portions of text from LIST1 to LIST2 and defining an insertion point for a negation particle.

FIG. 12 schematically illustrates a flow chart of a process 126 of identifying and moving portions of text from LIST1 to LIST2 and defining an insertion point between the end of LIST1 and the start of LIST2 for a negation particle "ne/n'". Process flow begins at point B and goes first to process 230 where the CLITIC bit and the NEGPOL bit of each word in the phrase are tested to identify pronouns and negation words. The CLITIC bit and the NEGPOL bit are part of lexicon information 282 in the syntax record 110. Next program flow continues to process 232 where PRMODS is tested to ensure that all words with the CLITIC bit set are to the left of the insertion point and all words with the NEGPOL bit set are to the right of the insertion point. If the words are not arranged as expected with respect to the insertion point, then the sentence is seen as too complex or too full of errors to correct negation and program flow exits at 128 to go back to the start without offering the user a correction. If, however, the words are arranged as expected with respect to the insertion point, then program flow continues at 234 to process 236. At process 236, words to the right of the insertion point are moved from LIST1 to LIST2.

Figure 13:
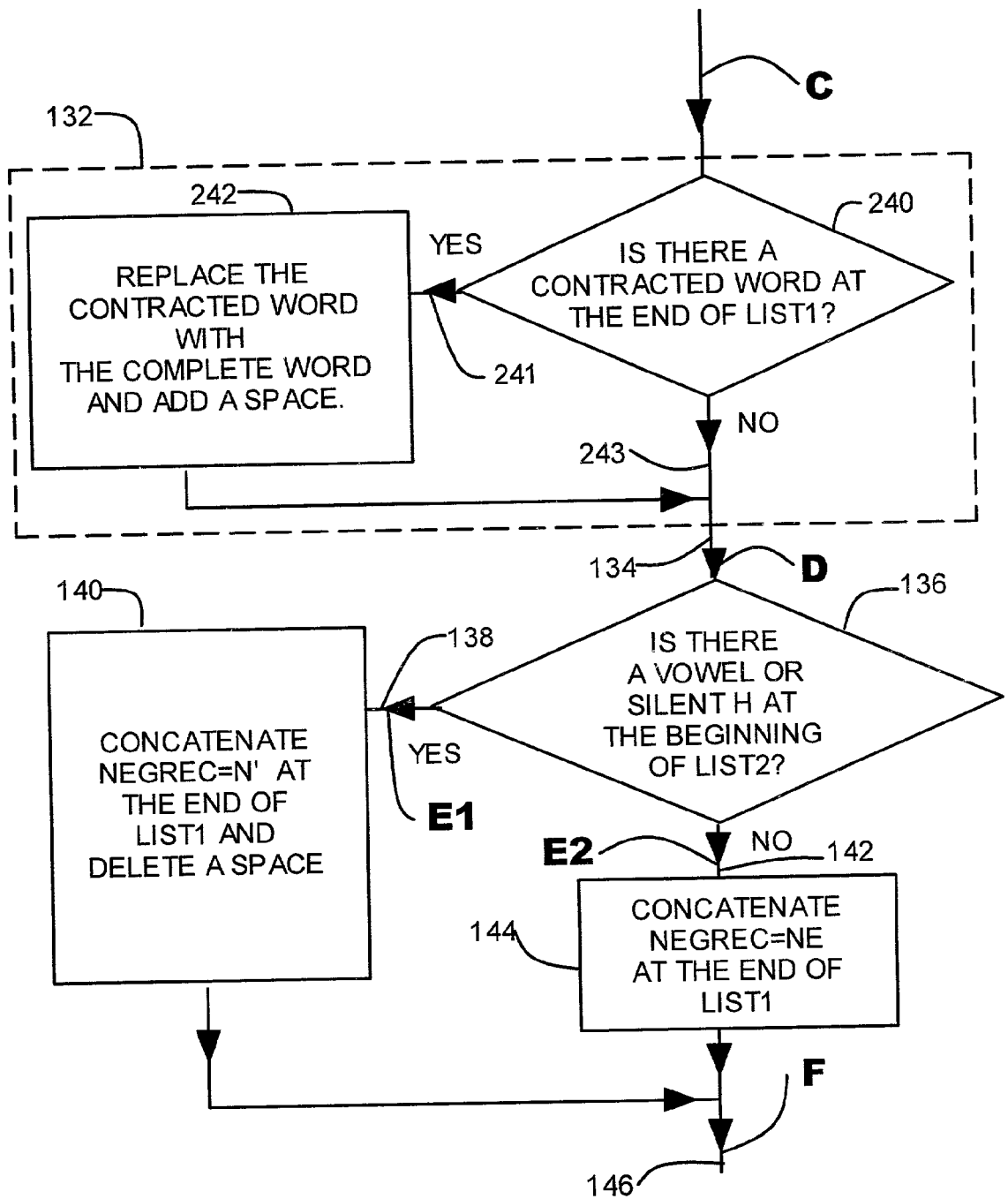
FIG. 13 schematically illustrates a flow chart of a process of undoing contraction (elision) at the end of LIST1 and concatenating a selected negation record (NEGREC) to the end of LIST1.

FIG. 13 schematically illustrates a flow chart of a process 132 of undoing contraction (elision) at the end of LIST1 and a process 136, 140 and 144 of concatenating a selected negation record (NEGREC) to the end of LIST1. Program flow for process 132 begins at point C and LIST1 is tested to determine if there is an elided (contracted) word at the end of LIST1. If there is a contracted word, then program flow continues along line 241 to process 242. In process 242, the contracted word is replaced with the corresponding complete word, and a space is added. If there is no contracted word, then program flow continues along line 242. After process 132 is complete, regardless of whether there is an elided word or not at the end of LIST1, program flow continues along line 134 to point D. Processes 136, 138 and 144 are explained above in connection with FIGS. 2-14.

Figure 14:
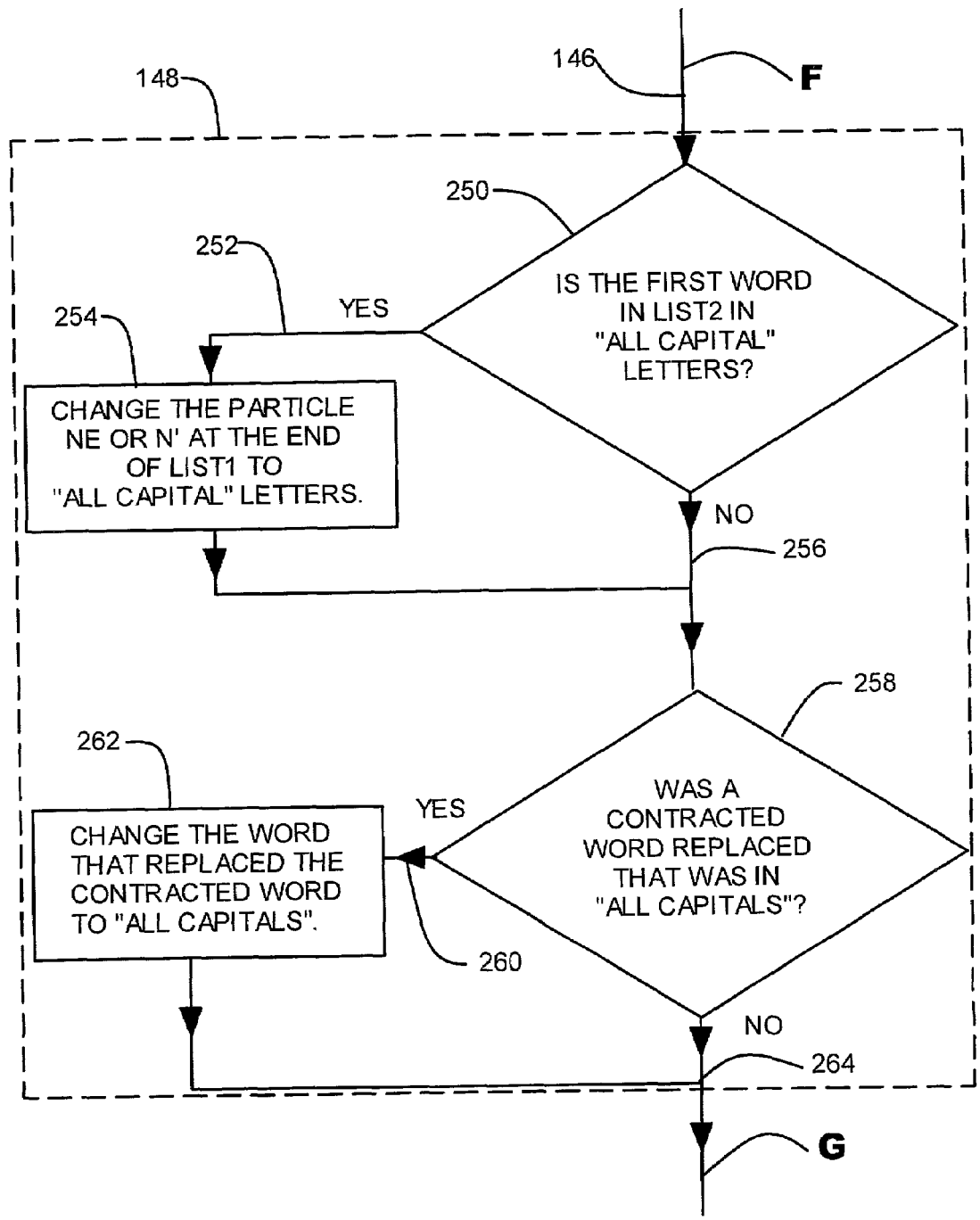
FIG. 14 schematically illustrates a flow chart of a process of adjusting upper case and lower case typography around the insertion point.

FIG. 14 schematically illustrates a flow chart of a process 148 of adjusting upper case and lower case typography around the insertion point. At process 250, if the first word in LIST2 is all capitals, then the corresponding particle that precedes it will also be made all capitals as illustrated at process 254. If the first word in LIST2 is not all capitals, then program flow just continues along line 256. Next, process 258 tests whether the contracted word replaced in process 132 was capitalized. If the contracted word was capitalized, then its replacement word is also capitalized. With a contracted word such as "J'" it can be ambiguous whether the replaced word is to be capitalized or ALL CAPITALS. When a definite answer can't be found, the default is to just capitalize the first letter.

The processes described above in connection with FIGS. 2-14 can be stored on a computer-readable medium as a plurality of sequences of instructions, the plurality of sequences of instructions including sequences which, when executed by a computer system, cause the computer system to perform the processes.

Although the present invention has been described with reference to preferred embodiments, workers skilled in the art will recognize that changes may be made in form and detail without departing from the spirit and scope of the invention.

What is claimed is:

1. A computer-implemented method of correcting negation errors in a French language text, comprising:
    generating a syntax record of a verbal phrase of the text, the syntax record including records of words in the verbal phrase, lexicon information for the words, and syntax attributes for the words;
    searching the syntax record for a missing particle "ne/n'";
    if the particle "ne/n'" is not found, calculating a syntactically correct insertion point for the particle "ne/n'"; and
    displaying to the user a rewrite of a correct form of the particle "ne/n'" at the insertion point.

2. The method of claim 1 wherein the syntax record is generated by parsing.

3. The method of claim 1, and further comprising:
    identifying part of the verbal phrase that precedes a main verb indicated in the syntax record, and copying the identified part of the verbal phrase to a first record.

4. The method of claim 3 wherein the insertion point in a simple declarative phrase is calculated by:
    testing the syntax record for each word in the first record to determine if it is a non-subject pronoun;

testing the syntax record for each word in the first record to determine if it is a subject pronoun; and moving the portion of the first record that is after any subject pronoun and includes any non-subject pronouns to a second record to place the insertion point between the end of the first record and the start of the second record.

5. The method of claim 1, and further comprising:
undoing elision before the insertion point.

6. The method of claim 1 wherein the correct form of the particle "ne/n'" is determined by:
testing the verbal phrase immediately following the insertion point for an initial vowel or a silent "h";
if a vowel or silent "h" is found, concatenating the particle "n'" at the insertion point; and
if a vowel or silent "h" is not found, concatenating the particle "ne" at the insertion point.

7. The method of claim 1, further comprising:
adjusting of uppercase/lower case letters in the particle "ne/n'".

8. The method of claim 1 wherein the searching of the syntax record for a missing particle "ne/n'" comprises:
searching the syntax record for a negation word;
testing a syntax attribute of the negation word to determine if the syntax attribute of the negation word indicates negation; and
if the syntax record of the negation word indicates negation, searching the syntax record for the particle "ne/n'".

9. A computer system configured to correct negation errors in a French language text, comprising:
a parser adapted to receive a verbal phrase of the text and providing a syntax record including records of words in the verbal phrase, lexicon information for the words, and syntax attributes for the words;
a search module adapted to provide an indication that the syntax record is missing a particle "ne/n'";
a calculation module that provides a syntactically correct insertion point for the particle "ne/n'" if the particle "ne/n'" is not found by the search module; and
a display module that provides a display of a rewrite of a correct form of the particle "ne/n'" at the insertion point.

10. The computer system of claim 9, further comprising:
a phrase divider that provides a copy of a portion of the phrase that precedes the main verb to a first record.

11. The computer system of claim 9 wherein the calculation module includes:
a first test module that finds words in the first record that are non-subject pronouns;
a second test module that finds words in the first record that are subject pronouns; and an insertion point module that generates an insertion point after any subject pronoun and before any non-subject pronoun.

12. The computer system of claim 9, further comprising:
an undoing module that undoes elision before the insertion point.

13. The computer system of claim 9 wherein the correct form of the particle "ne/n'" is determined by:
testing the verbal phrase immediately following the insertion point for an initial vowel or a silent "h";
if a vowel or silent "h" is found, concatenating the particle "n'" at the insertion point; and
if a vowel or silent "h" is not found, concatenating the particle "ne" at the insertion point.

14. The computer system of claim 9, further comprising:
adjusting of uppercase/lower case letters in the particle "ne/n'".

15. The computer system of claim 9 wherein the searching of the syntax record for a missing particle "ne/n'" comprises:
searching the syntax record for a negation word;
testing a syntax attribute of the negation word to determine if the syntax attribute of the negation word indicates negation; and
if the syntax record of the negation word indicates negation, searching the syntax record for the particle "ne/n'".

16. A system configured to correct negation errors in a French language text, comprising:
means for providing a computer system;
means for generating a syntax record of a verbal phrase of text;
means for searching the syntax record for a missing particle "ne/n'";
means for calculating an insertion point; and
means for displaying a rewrite with the particle "ne/n'" at the insertion point.

17. A computer-readable medium having stored thereon a plurality of sequences of instructions, the plurality of sequences of instructions including sequences which, when executed by a computer system, cause the computer system to perform the steps of:
generating a syntax record of a verbal phrase of the text, the syntax record including records of words in the verbal phrase, lexicon information for the words, and syntax attributes for the words;
searching the syntax record for a missing particle "ne/n'";
if the particle "ne/n'" is not found, calculating a syntactically correct insertion point for the particle "ne/n'"; and
displaying to the user a rewrite of a correct form of the particle "ne/n'" at the insertion point.

* * * * *